(No Model.)

4 Sheets—Sheet 1.

J. SUTTON.
PROCESS OF FILTRATION.

No. 460,271.  Patented Sept. 29, 1891.

Witnesses:
C. Sundgren
D. H. Hayrood

Inventor:
John Sutton
by his attorneys
Brown & Griswold (No Model.) 4 Sheets—Sheet 3.

J. SUTTON.
PROCESS OF FILTRATION.

No. 460,271. Patented Sept. 29, 1891.

Witnesses:
O. Lundgren
D. N. Hayward

Inventor:
John Sutton
by his attorneys
Brown & Griswold (No Model.) 4 Sheets—Sheet 4.

J. SUTTON.
PROCESS OF FILTRATION.

No. 460,271. Patented Sept. 29, 1891.

Witnesses:
C. J. Sundgren
D. H. Hayford

Inventor
John Sutton
by his attorneys
Brown & Griswold

UNITED STATES PATENT OFFICE.

JOHN SUTTON, OF ISLIP, NEW YORK.

PROCESS OF FILTRATION.

SPECIFICATION forming part of Letters Patent No. 460,271, dated September 29, 1891.

Application filed March 6, 1890. Serial No. 342,880. (No model.)

*To all whom it may concern:*

Be it known that I, JOHN SUTTON, of Islip, in the county of Suffolk and State of New York, have invented a certain new and useful Improvement in Process and Apparatus for Filtering Beer and other Liquids, of which the following is a specification.

I will describe in detail a process embodying my improvement and apparatus adapted to carry the same into effect, and then point out the novel features in claims.

Figure 1:
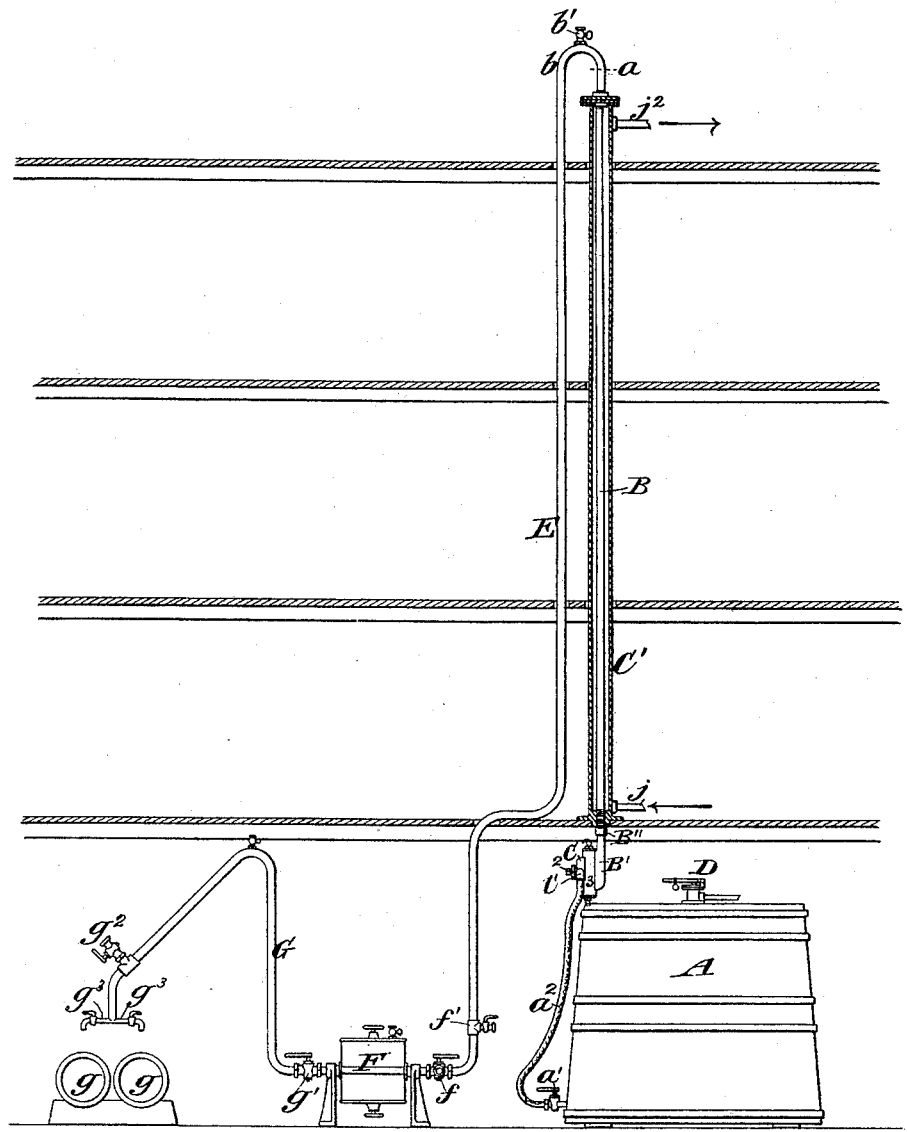
Figure 2:
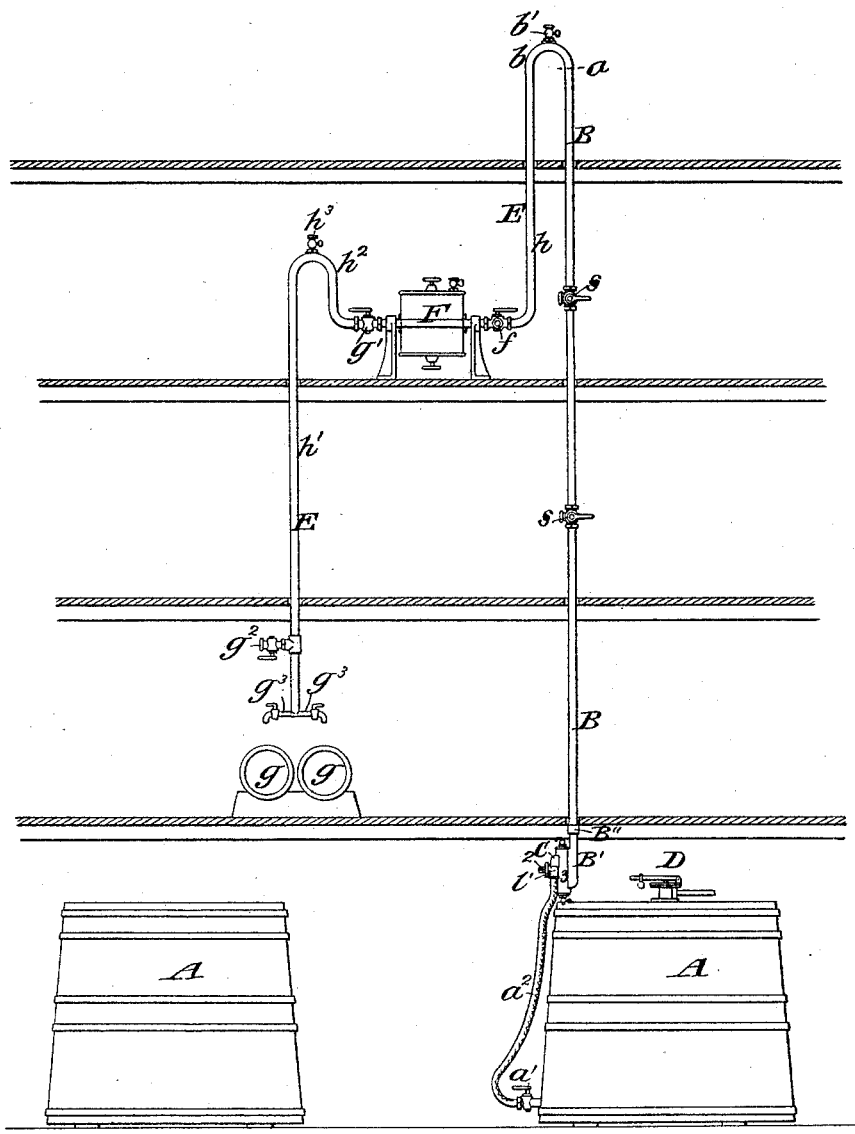
Figure 3:
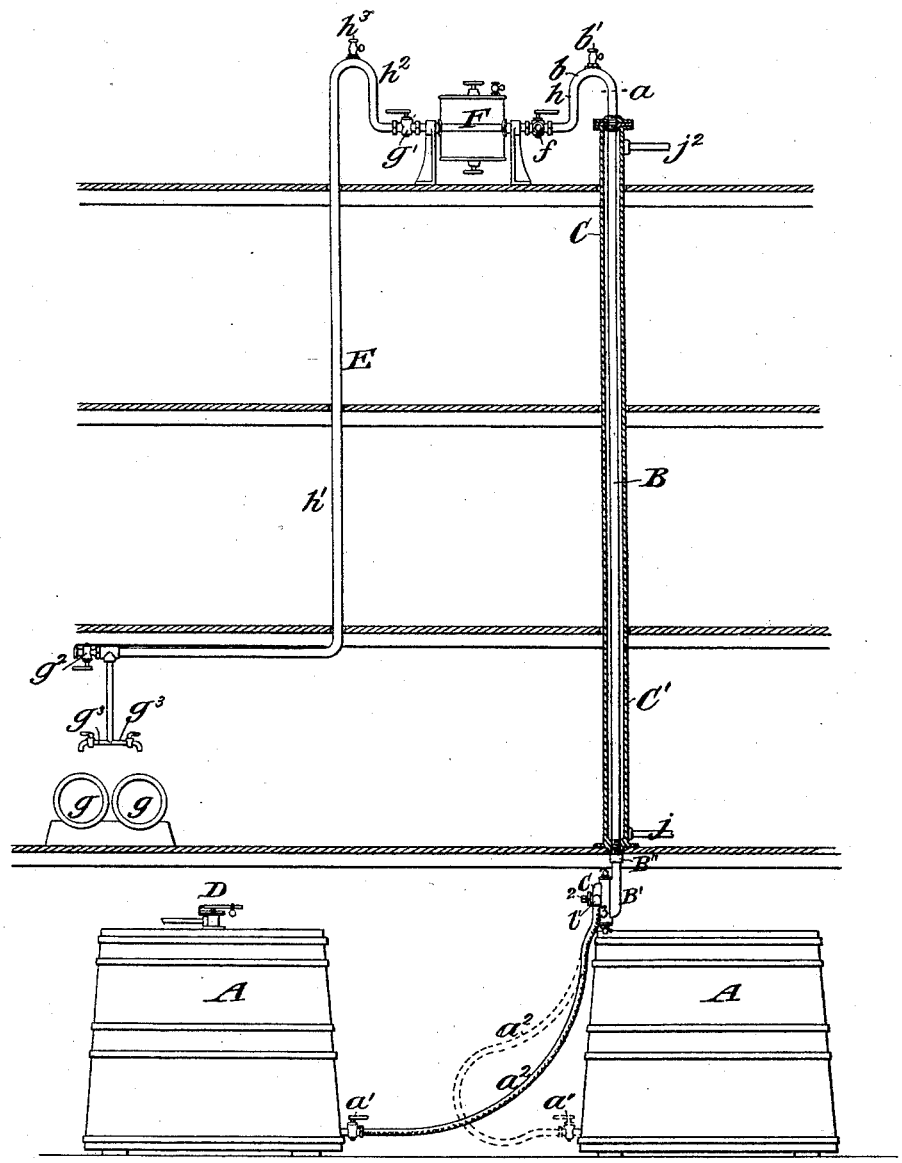
Figure 4:
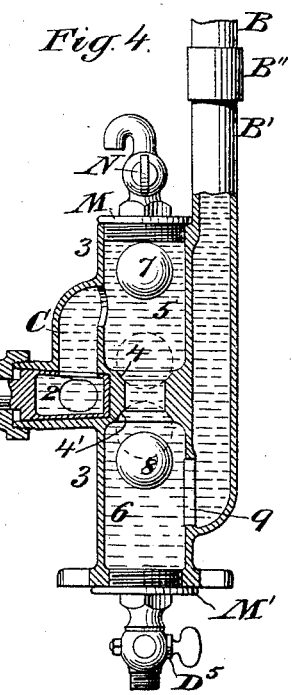
Figure 6:
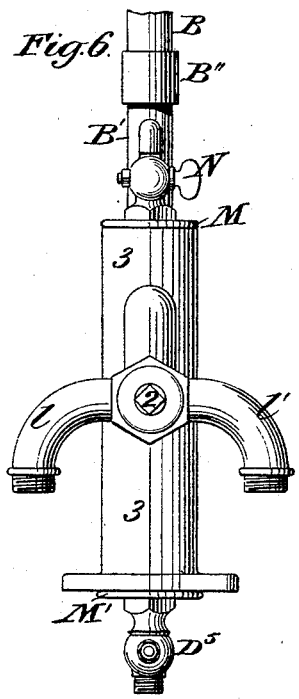
Figure 5:
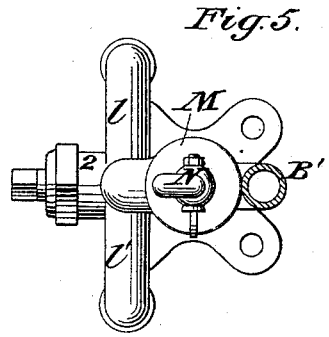

In the accompanying drawings, Figure 1 is an elevation illustrating apparatus adapted to carry my improvement into effect, together with several floors of a building, the latter being shown in section, pressure alone being used on either floor. Fig. 2 is a similar view showing apparatus of a somewhat modified form, the pressure being on the inlet side and the vacuum on the outlet side. Fig. 3 is a similar view showing apparatus also somewhat modified, the vacuum being used alone. Figs. 4, 5, and 6 are details of a trap employed.

Similar letters of reference designate corresponding parts in all the figures.

A designates casks in which liquid—as, for instance, beer or other aerated gaseous or vaporous or other liquid—is contained. These casks, where beer or liquid of a similar nature is stored therein, are usually placed in the cellar or vaults beneath a building. When it is desired to filter the liquid in order to clarify it previous to placing it in barrels, it is conducted from the cask to a filter, also in the cellar or vault, and is from the filter conveyed away to the barrels in vault or above the same. It has been customary to force the liquid from the cask or casks under pressure exceeding atmospheric pressure, by which means the liquid was forced through the filter from the inlet side thereof. In such process the pressure exerted upon the liquid in the cask is continued therein through the filter, so that the liquid in the filter is subjected to the same pressure and pressure from the same source as that in the cask, less the friction in passing through filtering-malts, &c. By my improvement I cause the liquid to be passed through the filter by the force due to the weight of a falling column of the liquid less the friction. This may either be by suction exerted at the outlet side of the filter, whereby the liquid is caused to be drawn through the filter by the weight of the descending column, (see Fig. 3,) or it may be by pressure exerted by the falling column to force the liquid into and through the filter from the inlet side. (See Fig. 1.) Again, it may be accomplished by employing both of these means in conjunction with each other in order to effect the passage of the liquid through the filter. (See Fig. 2.)

In carrying out my improvement I first cause the liquid contained in a cask A to be forced upwardly through a stand-pipe B to any desired height—as, for instance, to the line $a$, Fig. 1. The liquid should not be raised in this stand-pipe by vat-pressure to a point where it will overflow the upper end or enter the bend $b'$. The liquid is forced upwardly in the stand-pipe B by means of pressure exerted upon the surface of the liquid in the cask A, which pressure is greater than atmospheric pressure. Such pressure may be exerted by an ordinary air-pump, (not shown in the drawings,) by which air or any gas is forced into the cask. The liquid is delivered from the lower part of the cask through a cock $a'$ into a pipe $a''$. (Shown as a piece of flexible hose, connected near one of its ends to the said three-way cock 2.) I prefer to use this flexible hose, so that connection may be made with any of the different casks of a series of casks, as shown more clearly in Fig. 3.

The upper end of the hose from the cask A is coupled to the side bends 1 1', of any suitable kind of cock 2 (here shown as a three-way cock) for inletting liquid, air, and gas to the trap chambers or vessels 3. They may admit the liquid from one or more casks at the same time, and either one or both may be shut off from the trap or cask, or may be opened to it, and without stopping the operation, thus permitting another tank or cask to be coupled ready for its liquid to flow to the trap or column B by turning the cock to suit. This trap-vessel may be of any suitable form and size, (and transparent or not,) but somewhat larger in diameter than the column B. Within the trap-shell, about midway of its length, is a division having a circular passage through it, centrally placed, its ends forming an upper and a lower seat 4 4' for the upper and lower floating ball-valves acting directly over each other. The floating ball 7, when the liquid ceases to flow, and the air and gases enter instead, will descend and centralize and fit tightly to its seat when the liquid surface is so pressed upon and lowered by the incoming pressure of air and carbonic acid or other gas into the chamber 5, (see dotted ball,) and will thus prevent the air and gases passing from the cask to the lower chamber 6 and to the column B. The floating ball 8 in the lower chamber is to prevent a back-flow of liquid from the column through the chamber and valve-passage to the cask. (See dotted ball seated.) The usual check-valve may be used there or elsewhere, as required, instead. The balls show their positions while the current of liquid is passing from the cask or casks to the column. These ball-valves cannot choke. They are self-acting and prevent the air and gases entering the column and filtering apparatus, and prevent the return of liquid from the column should intermittent pressure occur or the operation be stopped. In this event the ball 8 would be pressed to its seat by the weight of liquid in column. The liquid-conducting pipe B' may be cast or made with the trap-shell 3, and is connected to the column B by coupling B'', or otherwise. Its bottom end, opening within the chamber 6, may be there enlarged and grated, if required, to prevent the ball 8 reducing the area of the outlet 9 to the column.

C is the liquid and air and gas inlet and conduit from the cock 2 to the chamber 5. The bottom end of chamber 6 collects any descending sedimentary matter coming from the cask's trap or column, which may be let off occasionally by the blow and cleansing cock $D^5$, which also serves for emptying column and trap 3.

M M' are removable covers to admit the balls to their chambers.

N is a vent for letting off air and gases when so required.

The cocks a' and 2 being open and pressure applied to the surface of the liquid in cask A, the liquid will be forced therefrom upwardly into and through the trap 3 and into the pipe B to the required height—for example, a—below the bend b, such height depending of course upon the degree of pressure exerted upon the liquid in the cask. In order that such pressure may not exceed a desired limit, I provide the casks or air-pump with safety-valves D, which may be adjusted to vent the casks or air-pump when undue pressure is exerted.

Referring more particularly to Fig. 1, E designates a stand-pipe, which extends vertically, and, as shown, substantially parallel with the pipe B. The pipes B E are connected at their upper ends by a return-bend b, in which is arranged any suitable vent b'. The use of a return-bend is advantageous because it avoids any space in which gases may collect and remain. The pipe E communicates at its lower end (see Figs. 1 and 2) with the inlet side of a filter F, which may be of any desired construction. In the pipe E is a cock f. Near the cock f, and arranged in the pipe E, so as to communicate with the latter, is a coupling-cock f'. Any suitable vent or vents may be used for relieving the filter and pipes and bends, where required, of pent-up gases. From the outlet side of the filter extends a pipe G, Fig. 1, through which the clarified liquid from the filter is conveyed to barrels g, which it is desired to fill. The pipe G may be carried laterally or upwardly to any desired distance and discharge at a point above or below the filter, which will enable the liquid contained therein to exert a back pressure in the filter, so as to keep the filter at all times full of liquid and to discharge at any required pressure or velocity into the barrels. At the discharge end of the pipe located on the outlet side of the filter are discharge-pipes provided with suitable cocks $g^3$, a vent $h^3$ at the bend, and a flushing-cock $g^2$. The barrel g may be filled from the branch pipes by manipulating the cocks $g^3$.

In starting the apparatus I open the cocks a' and the cock 2 of the gas and liquid trap and force the liquid from the cask upwardly through the traps into the stand-pipe B to the required height, it being sustained at a by vat-pressure. I then close the cock f and open the cock f' in the pipe E, opening the vent b' in the return-bend b. I then let in liquid, preferably water, under pressure into the pipe E by any suitable pipe or hose connecting with the coupling-cock f'. The liquid thus forced into the pipe E rises and overflows through the return-bend b, meeting the column of liquid in the pipe B at a, the contained air being forced out through the vent b'. The vent b' is now closed or closes itself, the cock f opened, and at the same time the supply of water is shut off at the coupling-cocks f'. The outlet-cock g' in the pipe G is also opened, together with the cocks in the branch pipes $g^3$. The water or liquid from the pipe E will now flow by gravity through the filter F, the pipe G, and out through the branch pipes and cocks $g^3$ to waste. This results in a siphoning action, which causes the liquid in the pipe B to be sucked from a only and to be drawn over and through the return-bend b. The beer or liquid from the pipe B will then in turn descend by gravity through the pipe E, united with and following the flushing-water and will with it pass through the filter F, where it will be clarified, passing through the pipe G and out through the branch pipes and cocks $g^3$. When the clarified liquid begins to flow from the branch pipe and cocks $g^3$ or either of them, as the case may be, it may be conveyed into the barrels g by any suitable means. Thus it will be observed that the pressure exerted upon the liquid in the cask A operates only to force liquid therefrom to a certain height from which it is lifted and siphoned off by vacuum force or suction and its liquid weight, and that in this example of my improvement the liquid is forced through the filter from the inlet side thereof not by pressure exerted upon the liquid in the cask A, but by the force due to the weight of the falling column of liquid in the pipe E. The clarified liquid may be discharged in its receptacles either on the vault-floor or upon floors above.

In the example of my improvement illustrated in Fig. 2 the construction is similar to that shown in Fig. 1, except that the force exerted to cause the passage of the liquid through the filter is a combined force due to the weight of a descending column of unfiltered liquid in a portion $h$ of the pipe E, tending to force the liquid through the filter from the inlet side by pressure and the descent of a column of clarified liquid in another portion $h'$ of the pipe E, which operates from the outlet side of the filter to suck or draw the liquid through the filter. In this case the filter is intermediate of the portions $h\ h'$ of the pipe E, and is illustrated as placed upon a floor, which may be on any story higher than the cask A, from which the liquid is taken. I prefer that the portion $h'$ of the pipe should be constructed with a return-bend $h^2$ of sufficient height above the filter to cause the liquid therein to keep the filter always full. This return-bend may be provided with a vent $h^3$. The coupling-cock $f'$ for the introduction of water under pressure to charge the pipes E will preferably be arranged in the portion $h$ of said pipe.

The example of my improvement illustrated in Fig. 3 is like that shown in Fig. 2, except that all or nearly all of the force exerted to pass the liquid through the filter is caused by the weight and suction of the falling or outletting column of filtered liquid in the portion $h'$ of the pipe E, which sucks or draws the liquid through the filter B from the liquid-surface $a$ in the column.

In all examples of my improvement the liquid in the pipe B is raised by the pressure in the cask A to such height only that its surface may always stand below the return-bend $b$. The force necessary to pass the liquid through the filter in every case is a force due to the weight of a descending column of liquid, which weight will either force the liquid through the filter from the inlet side or suck or draw it through the same from the outlet side, or both.

This process for filtering and outletting of the liquid, Figs. 2 and 3, will cause less compression of the inlet-surface of the filtering mass or its fibers and pores by the lessened pressure of the entering liquid. Consequently there will be less closing up of the innumerable and imperceptible pores or facial spaces in the filter mass, as the impurities will be drawn or sucked farther to the interior of the filtering material by the outletting liquid and suction than is possible in any case when filtering under pressure only on the inlet side, such inlet-pressure serving to retard more and more the passage of liquid through the filter by the impurities sooner plugging up and finally plastering over the whole area of the receiving or inletting surface of the filtering material, thus causing the impurities to enter but partially into its depth and the filter to become clogged and in a shorter time be unfitted for necessary and continuous work. The greater the liquid-pressure on the inlet side the more difficult will be the filtering and the sooner the operation will terminate from clogging. The greater the weight or suction on the outlet side, the liquid column or vacuum being kept unbroken, the freer and more copious will be the flow of the filtered liquid in a given time and longer will be the operation without stopping to cleanse the filtering material.

In Figs. 1 and 3 I have shown means whereby liquid ascending through the pipe B may be chilled or heated, if desired. Such means consist of the surrounding tube C'. Into these tubes may be passed any suitable refrigerating or heating liquid, air, or fluid for refining sirups, oils, and dense liquids through a pipe $j'$. The liquid may find an exit through a pipe $j^2$. As the pipe B will pass through the refrigerating or heating means, the liquid passing through the pipe B to and from the filter will be cooled or heated, as desired. The tube C' may, if desired, be applied to the pipes E or G, or both, as may be desired, and may cool or heat the filtered liquid passing from the filter.

It is to be understood that my process and apparatus are adapted for use in filtering any desired kind of liquid and that the filter may be placed on any floor of a building above the casks which may be advantageous.

The pipe B may, if desired, be provided with separate cocks $s$, provided with outlets and air valves or vents, from which liquid in said pipe may be delivered at any desired point in its height to the filter. Where one of the cocks $s$ is used, the liquid from the cask A will only be forced to a height in the pipe coincident or approximately so with the cock, so that when a lesser pressure is required, (to suit the article to be filtered,) the pressure on the vat being lessened to suit, much wear and tear of tank and apparatus, power, &c., may be economized.

By conducting the liquid to be filtered upwardly to a predetermined height under a constant pressure within the vat I provide a convenient arrangement for warming the denser liquids and cooling the thinner liquids, and at the same time provide for the settling of sediment, so that the liquid led from the top or upper portion of the standing column will be in a great measure freed from sediment before being led to the filter. I also provide for introducing the liquid to the filter under its own weight exerted upon the inlet side or upon the outlet side, or upon both, so that the filtering is done without employing the exhaust mechanism—such, for instance, as an exhaust-pump—which would tend to withdraw from the liquid the gases which it is desirable should be retained therein, since the liquid and gases are confined within a continuous pipe from the tank to the storage-receptacle. The elevation of the liquid above the vat also provides for storing the liquid upon floors where plenty of light may be had, above the cellar in which the vat is usually located, and provides for the varying of the pressures upon the inlet and outlet side of the filter, as may be desired.

What I claim as my invention, and desire to secure by Letters Patent, is—

1. The process of filtering liquid, consisting in conducting the liquid in a closed conduit from the supply-tank to its exit from the filter and during its passage forcing it to a certain height at a pressure exceeding atmospheric pressure and then causing the liquid to pass by siphoning through the filter by force due to the weight of a descending column of the liquid, substantially as specified.

2. The process of filtering liquid, consisting in forcing the liquid to a certain height at a pressure exceeding atmospheric pressure, then siphoning the liquid off from that point and causing it to pass through the filter by force due to the weight of a descending column of the liquid, substantially as specified.

3. The process of filtering liquid, consisting in forcing the liquid to a certain height at a pressure exceeding atmospheric pressure and then causing the liquid to pass through the filter by siphoning it from the filter, substantially as specified.

4. The process of filtering liquid, consisting in forcing the liquid to a suitable height at a pressure exceeding the atmospheric pressure and then causing the liquid to pass through the filter and into the barrels by the combined suction and pressure of the inleting unfiltered liquid and the combined suction and pressure of the outleting filtered liquid, substantially as specified.

JOHN SUTTON.

Witnesses:
  FREDK. HAYNES,
  D. H. HAYWOOD.